United States Patent
Filleul et al.

(10) Patent No.: US 12,188,605 B1
(45) Date of Patent: Jan. 7, 2025

(54) CRAFTING SUPPORT SYSTEM AND ASSEMBLY INCLUDING THE SAME

(71) Applicant: Cricut, Inc., South Jordan, UT (US)

(72) Inventors: Bayden Filleul, Taumarunui (NZ); Mel Reynolds, Bray (IE); Jerome Tobin, Wicklow (IE); Norman Stevenson, Dublin (IE)

(73) Assignee: Cricut, Inc., South Jordan, UT (US)

( * ) Notice: Subject to any disclaimer, the term of this patent is extended or adjusted under 35 U.S.C. 154(b) by 470 days.

(21) Appl. No.: 17/245,907

(22) Filed: Apr. 30, 2021

Related U.S. Application Data

(60) Provisional application No. 63/018,267, filed on Apr. 30, 2020.

(51) Int. Cl.
*F16M 11/22* (2006.01)

(52) U.S. Cl.
CPC ....... *F16M 11/22* (2013.01); *F16M 2200/068* (2013.01); *F16M 2200/08* (2013.01)

(58) Field of Classification Search
CPC .............. F16M 5/00; F16M 2200/068; F16M 2200/08; F16M 11/22; B25H 1/00; B25H 1/0042; B25H 1/005; B25H 1/04; B23D 47/025; B41J 5/04; Y10S 269/901
USPC .............. 144/286.1, 286.5, 287; 248/346.01, 248/346.03, 346.3, 678, 302, 465.1, 107, 248/112, 153, 175; 83/859; 211/49.1, 211/60.1, 41.4, 85.31, 133.5, 181.1; D23/410
See application file for complete search history.

(56) References Cited

U.S. PATENT DOCUMENTS

| | | | | | |
|---|---|---|---|---|---|
| 2,531,298 | A | * | 11/1950 | Rucker | A45D 24/38 126/226 |
| 2,797,058 | A | * | 6/1957 | Packham | D06F 95/002 248/302 |
| 3,075,798 | A | * | 1/1963 | Smith | A47J 43/18 294/169 |
| 3,094,258 | A | * | 6/1963 | Punke | A47J 45/10 294/142 |
| 4,561,336 | A | * | 12/1985 | Davis | B23Q 1/03 144/287 |
| 4,860,807 | A | * | 8/1989 | Vacchiano | B25H 1/04 144/287 |
| 4,874,025 | A | * | 10/1989 | Cleveland | B23D 47/025 144/287 |
| 4,974,651 | A | * | 12/1990 | Carmon | B25H 1/04 144/287 |

(Continued)

*Primary Examiner* — Jonathan Liu
*Assistant Examiner* — Guang H Guan
(74) *Attorney, Agent, or Firm* — Honigman LLP; Grant Griffith

(57) ABSTRACT

A crafting support system is disclosed. The crafting support system is configured to receive a crafting apparatus. The crafting support system includes a proximal portion and a distal portion removably connected to the proximal portion. Each of the proximal portion and the distal portion includes a support rod and at least one support pad connected to the support rod. A first portion of the support rod of each of the proximal portion and the distal portion is axially offset from a second portion of the support rod of each of the proximal portion and the distal portion for forming a well that is sized for receiving the crafting apparatus. An assembly including the crafting support system and the crafting apparatus is also disclosed.

7 Claims, 14 Drawing Sheets

(56) References Cited

U.S. PATENT DOCUMENTS

| | | | | | |
|---|---|---|---|---|---|
| 5,004,029 | A | * | 4/1991 | Garner | B25H 1/04 144/287 |
| 5,099,951 | A | * | 3/1992 | Stockwell | B25H 5/00 182/20 |
| 5,203,254 | A | * | 4/1993 | Fletcher | A47J 37/0694 220/756 |
| 5,301,909 | A | * | 4/1994 | Chang | A47J 36/34 248/676 |
| D421,170 | S | * | 2/2000 | Siu | D34/6 |
| 6,029,721 | A | * | 2/2000 | O'Banion | B23D 47/025 144/286.5 |
| 6,164,194 | A | * | 12/2000 | Westmoreland | A47J 43/18 99/449 |
| 6,581,656 | B1 | * | 6/2003 | Harper | B25H 1/04 144/286.5 |
| 6,976,596 | B2 | * | 12/2005 | Brooks | F24C 15/16 211/90.03 |
| 7,845,259 | B2 | * | 12/2010 | Workman | B26F 1/3813 83/76.3 |
| 7,971,898 | B2 | * | 7/2011 | Wise | B62B 3/02 248/136 |
| D713,955 | S | * | 9/2014 | Hester | D23/410 |
| 9,849,605 | B2 | * | 12/2017 | Chang | B27B 27/06 |
| D813,565 | S | * | 3/2018 | Greenspon | D6/525 |

\* cited by examiner

CRAFTING SUPPORT SYSTEM AND ASSEMBLY INCLUDING THE SAME

CROSS-REFERENCE TO RELATED APPLICATIONS

This application claims priority under 35 U.S.C. § 119 (e) to U.S. Provisional Application No. 63/018,267, filed on Apr. 30, 2020. The disclosure of this prior application is considered part of the disclosure of this application and is hereby incorporated by reference in its entirety.

TECHNICAL FIELD

The present disclosure relates generally to a crafting support system and an assembly including the same.

BACKGROUND

This section provides background information related to the present disclosure and is not necessarily prior art.

Crafters utilize many kinds of tools to create crafting projects from a plurality of workpieces having a plurality of sizes. In some instances, a workpiece may not be sufficiently supported by a crafting apparatus. Therefore, a need exists in the art to develop devices that can assist a user in the course of creating a crafting project from a workpiece.

SUMMARY

This section provides a general summary of the disclosure, and is not a comprehensive disclosure of its full scope or all of its features.

One aspect of the disclosure provides a crafting support system configured to receive a crafting apparatus. The crafting support system includes a proximal portion and a distal portion removably connected to the proximal portion. Each of the proximal portion and the distal portion includes a support rod and at least one support pad connected to the support rod. A first portion of the support rod of the proximal portion is axially offset from a second portion of the support rod of the proximal portion for forming a well that is sized for receiving the crafting apparatus.

Implementations of the disclosure may include one or more of the following optional features. The support rod of the proximal portion includes: a base member; a first arm extending from a first end of the base member; and a second arm extending from a second end of the base member. Each of the first arm and the second arm includes: a first segment; a second segment; and an intermediate segment that connects a distal end of the first segment to a proximal end of the second segment.

In some implementations, the at least one pad includes a first proximal pad portion extending across and connecting a proximal end of the second segment of each of the first arm and the second arm. The at least one pad includes a second proximal pad portion extending across and connecting a distal end of the second segment of each of the first arm and the second arm.

In some implementations, a proximal end of the first segment of the first arm is connected to the first end of the base member. A proximal end of the first segment of the second arm is connected to the second end of the base member. The first portion of the support rod of the proximal portion is the first segment of each of the first arm and the second arm. The second portion of the support rod of the proximal portion is the second segment of each of the first arm and the second arm. The intermediate segment of each of the first arm and the second arm axially extends between: the first segment of each of the first arm and the second arm; and the second segment of each of the first arm and the second arm for: axially offsetting the first segment of each of the first arm and the second arm from the second segment of each of the first arm and the second arm.

In some configurations, the support rod of the distal portion includes: a base member; a first arm extending from a first end of the base member; and a second arm extending from a second end of the base member. Each of the first arm and the second arm includes: a first segment; and a second segment connected to and extending axially away from a distal end of the first segment.

In some examples, a proximal end of the first segment of the first arm is connected to the first end of the base member. A proximal end of the first segment of the second arm is connected to the second end of the base member. The first portion of the support rod of the distal portion is the first segment of each of the first arm and the second arm. The second portion of the support rod of the distal portion is the second segment of each of the first arm and the second arm. The at least one pad includes: a base portion; and a shoulder portion having: a proximal end that extends axially from and is connected to the base portion of the at least one pad; and a distal end that extends across and connects the second segment of each of the first arm and the second arm.

Another aspect of the disclosure provides an assembly including a crafting apparatus and a crafting support system. The crafting support system forms a well that is sized for receiving the crafting apparatus. The crafting support system includes: a proximal portion; and a distal portion removably connected to the proximal portion. Each of the proximal portion and the distal portion includes: a support rod and at least one support pad connected to the support rod. A first portion of the support rod of the proximal portion is axially offset from a second portion of the support rod of the proximal portion for forming the well.

Implementations of the disclosure may include one or more of the following optional features. The support rod of the proximal portion includes: a base member; a first arm extending from a first end of the base member; and a second arm extending from a second end of the base member. Each of the first arm and the second arm includes: a first segment; a second segment; and an intermediate segment that connects a distal end of the first segment to a proximal end of the second segment.

In some implementations, the at least one pad includes a first proximal pad portion extending across and connecting a proximal end of the second segment of each of the first arm and the second arm. The at least one pad includes a second proximal pad portion extending across and connecting a distal end of the second segment of each of the first arm and the second arm.

In some implementations, the support rod of the distal portion includes: a base member; a first arm extending from a first end of the base member; and a second arm extending from a second end of the base member. Each of the first arm and the second arm includes: a first segment; and a second segment connected to and extending axially away from a distal end of the first segment.

In some configurations, a proximal end of the first segment of the first arm is connected to the first end of the base member. A proximal end of the first segment of the second arm is connected to the second end of the base member. The first portion of the support rod of the distal portion is the first segment of each of the first arm and the second arm. The second portion of the support rod of the distal portion is the second segment of each of the first arm and the second arm. The at least one pad includes: a base portion; and a shoulder portion having: a proximal end that extends axially from and is connected to the base portion of the at least one pad; and a distal end that extends across and connects the second segment of each of the first arm and the second arm.

In some examples, the crafting apparatus includes a front door having an upper surface that is substantially coplanar with an upper surface of the first arm and the second arm of the support rod of the proximal portion of the crafting support system in order to provide a supplemental support surface for the upper surface of the front door of the crafting apparatus.

The details of one or more implementations of the disclosure are set forth in the accompanying drawings and the description below. Other aspects, features, and advantages will be apparent from the description and drawings, and from the claims.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

DESCRIPTION OF DRAWINGS

In order to describe the manner in which the above-recited and other advantages and features of the present disclosure can be obtained, a more particular description of the present disclosure briefly described above will be rendered by reference to specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
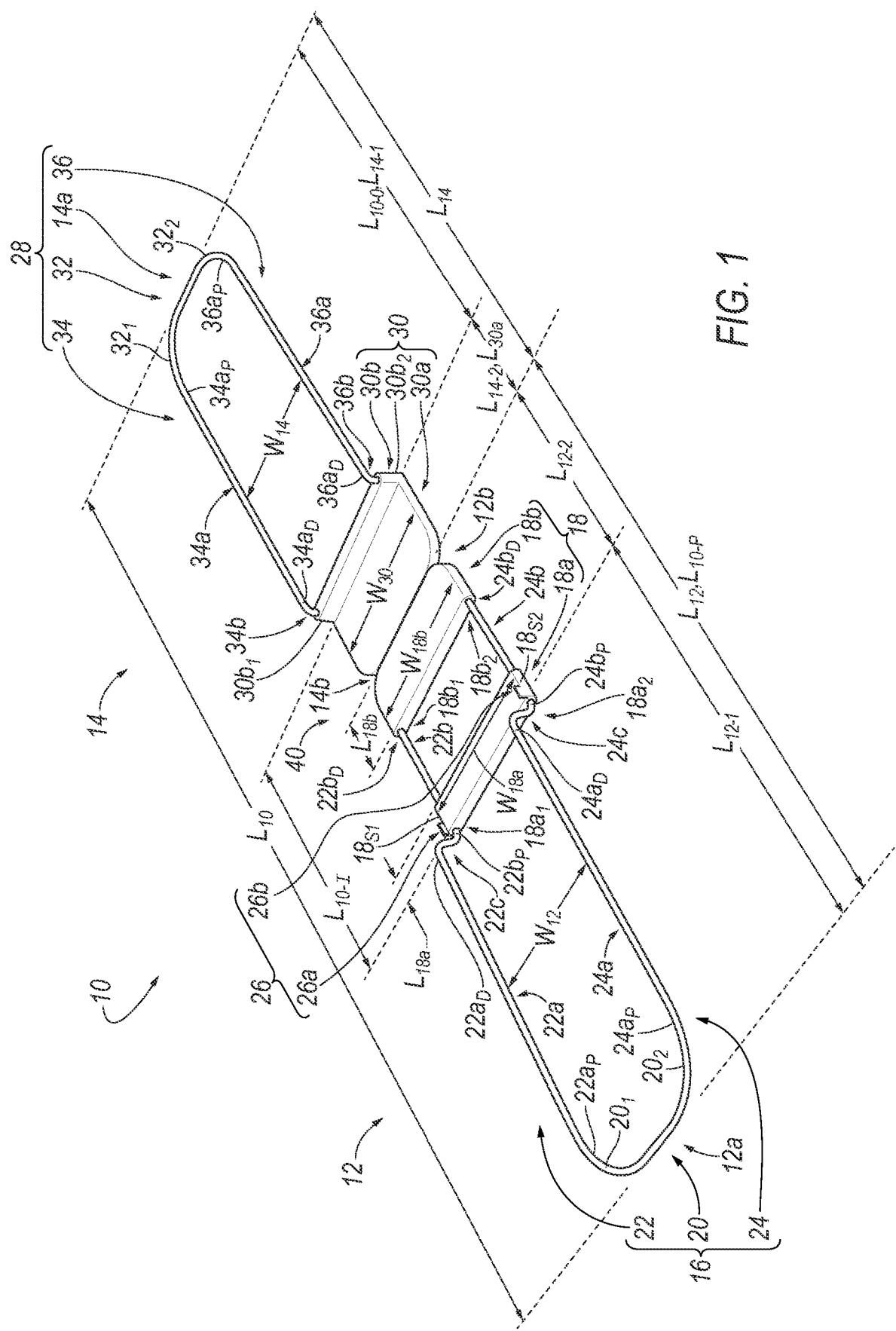
FIG. 1 is a perspective view of an exemplary crafting support system including a proximal portion and a distal portion that are arranged in a use orientation.
Figure 2:
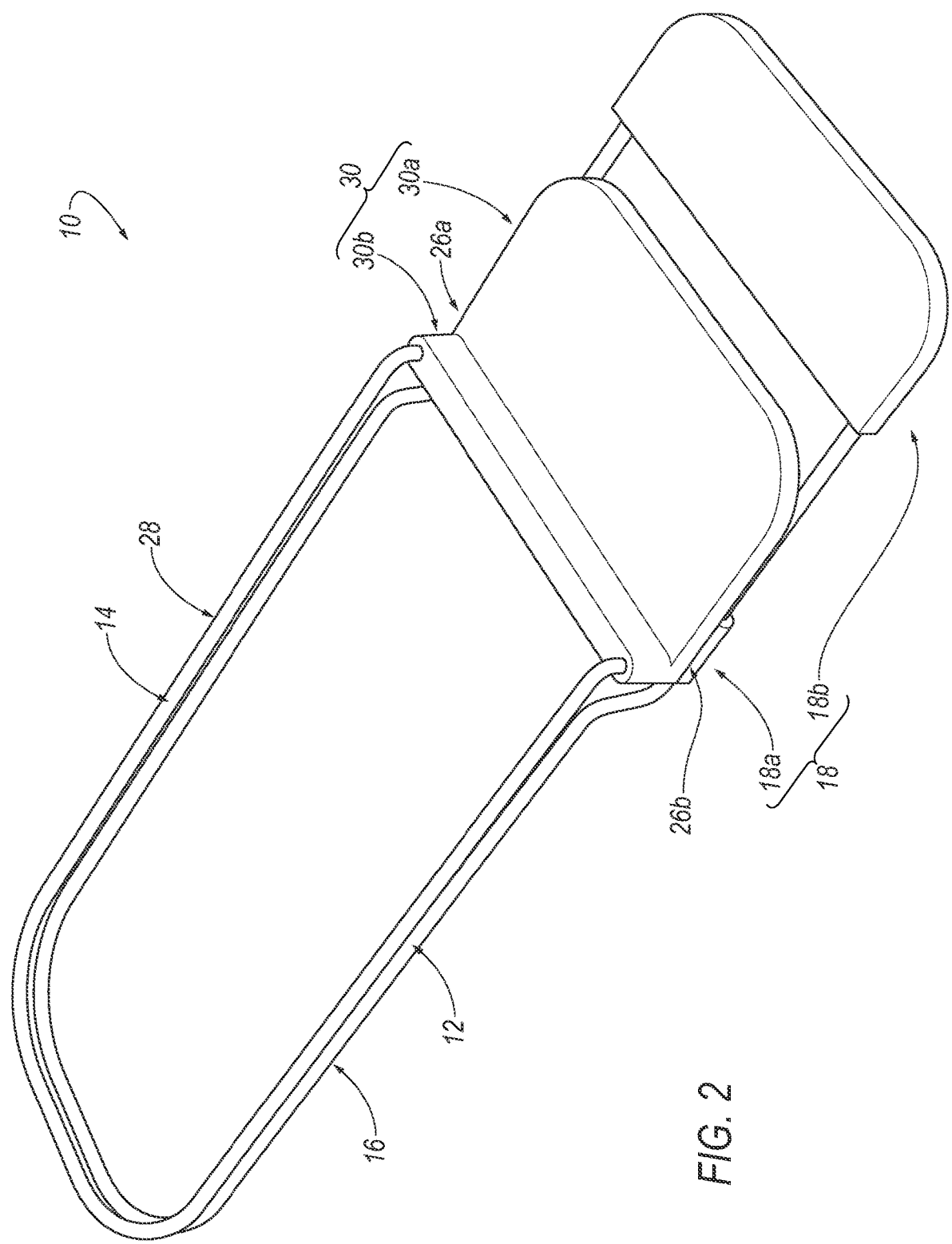
FIG. 2 is a perspective view of the crafting support system of FIG. 1 arranged in a stowed orientation.
Figure 3:
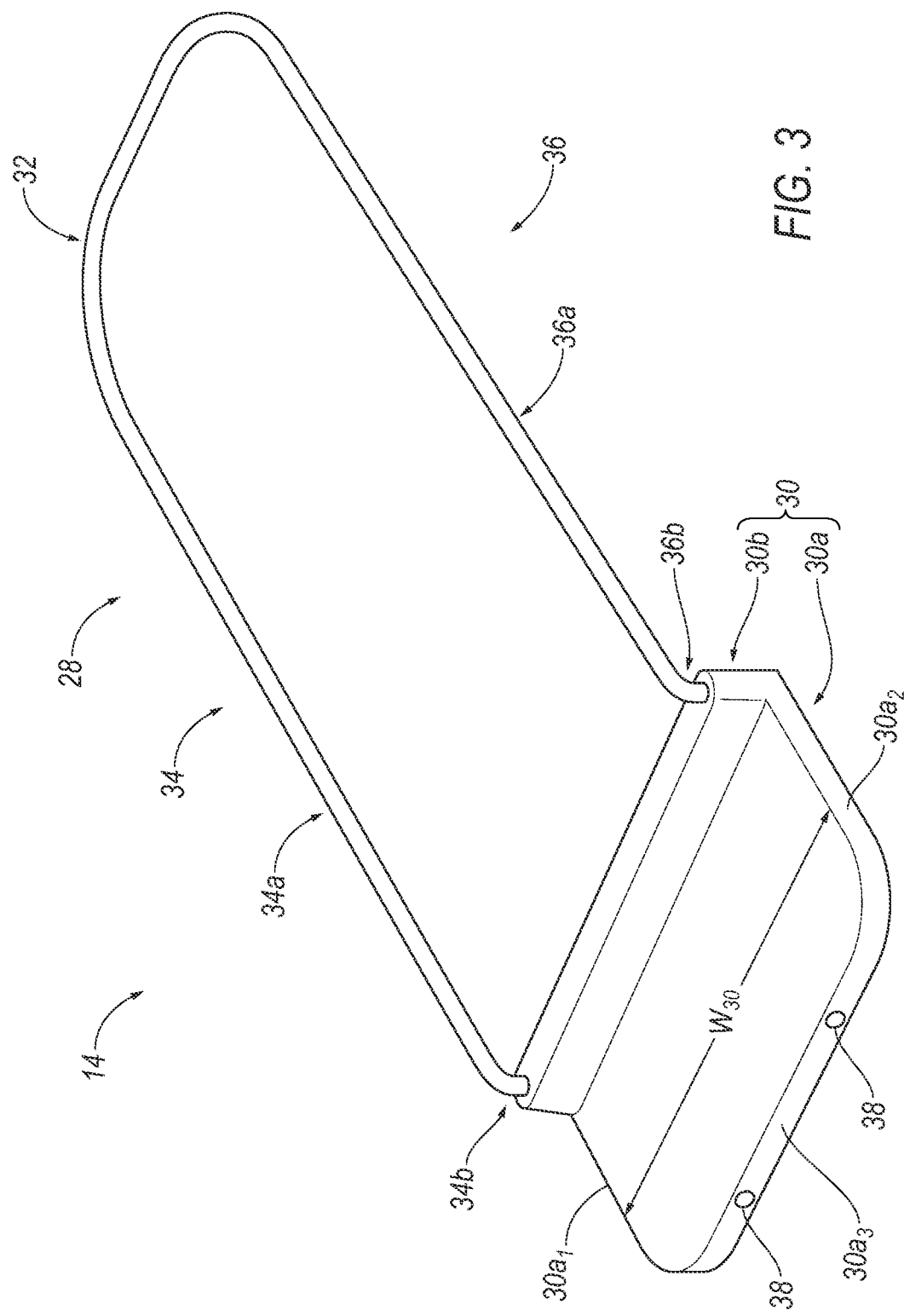
FIG. 3 is an enlarged perspective view of some of the distal portion of the crafting support system of FIG. 1 arranged in a separated orientation with respect to the proximal portion.

As seen at FIGS. 1-2, an exemplary crafting support system 10 includes a proximal portion 12 and a distal portion 14 (see also FIG. 3). The proximal portion 12 and the distal portion 14 may be used cooperatively or independently from one another. The proximal portion 12 may be selectively connected to the distal portion 14 as seen at FIG. 1 for arrangement in a "connected orientation" or a "use orientation". Alternatively, as seen at FIG. 2, the proximal portion 12 may be selectively disconnected from the distal portion 14 for arrangement in a "disconnected orientation" or a "stowed orientation". While referred to as a "disconnected orientation", the either one of the proximal portion 12 or the distal portion 14 may be used alone in a use orientation without the other one of the proximal portion 12 or the distal portion 14.

When arranged in the "connected orientation" or the "use orientation" of FIG. 1, the crafting support system 10 is configured to receive, support, be interfaced with, or be positioned relative a crafting apparatus (see, e.g., a crafting apparatus 1000 at FIGS. 4A-4B, 5, 6, and 7). The crafting apparatus 1000 may be sized to form a relatively compact shape/size/geometry that permits a user to easily carry/move the crafting apparatus 1000 from, for example, one's home to a friend's home where the friend may be hosting, for example, a "scrap-booking party" whereby crafting apparatus 1000 may conduct "work" on a workpiece (see, e.g., a workpiece 2000 at FIG. 5). The "work" conducted on the workpiece 2000 may be, for example, one or both of a printing operation (conducted by a printing device 1002 as seen at, e.g., FIG. 5) for printing an image on the workpiece 2000 and a cutting operation (conducted by a cutting device 1004 as seen at, e.g., FIG. 5) for cutting a design out of the workpiece 2000.

Figure 4A:
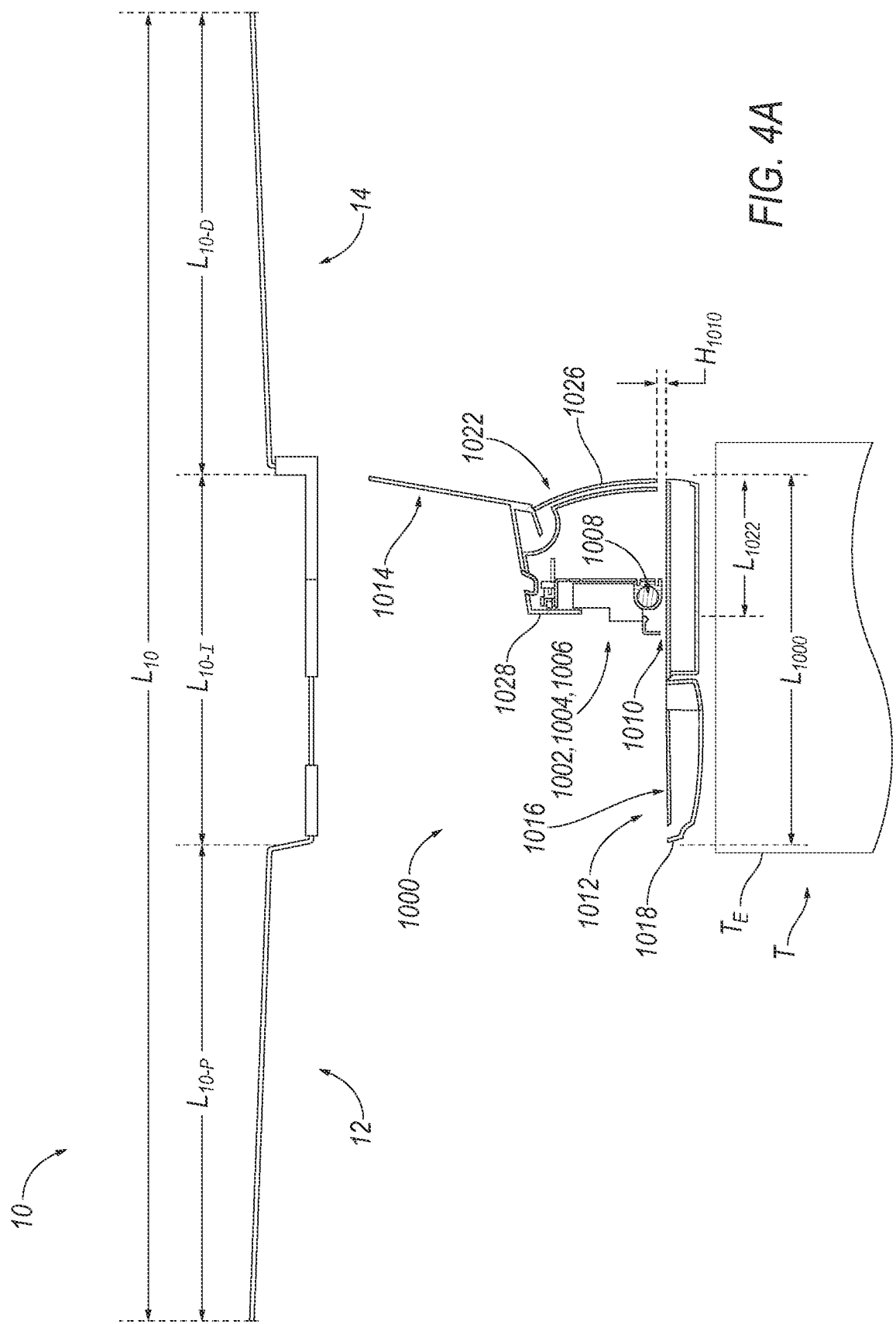
FIG. 4A is a side cross-sectional view of a crafting apparatus and a side view of the crafting support system of FIG. 1 arranged in the use orientation but positioned away from and not interfaced with the crafting apparatus.
Figure 4B:
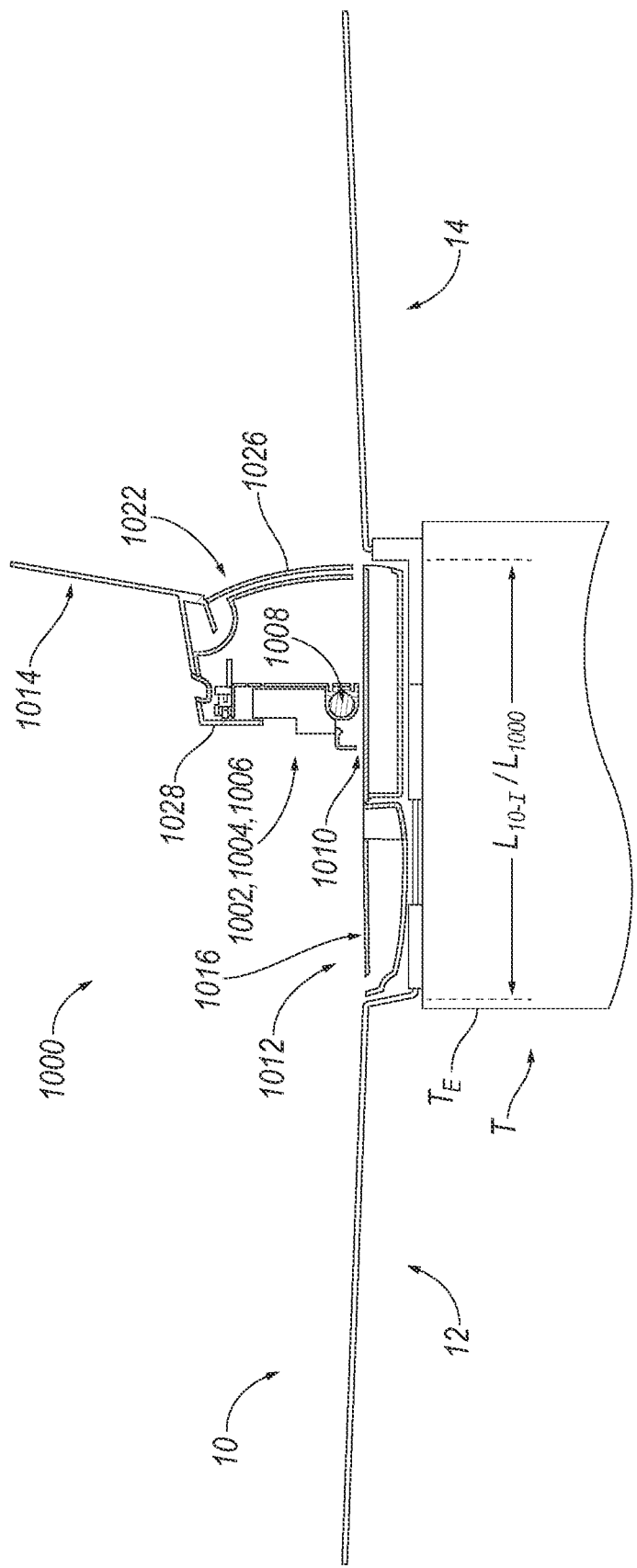
FIG. 4B is another view according to FIG. 4A with the crafting support system interfaced with the crafting apparatus.
Figure 5:
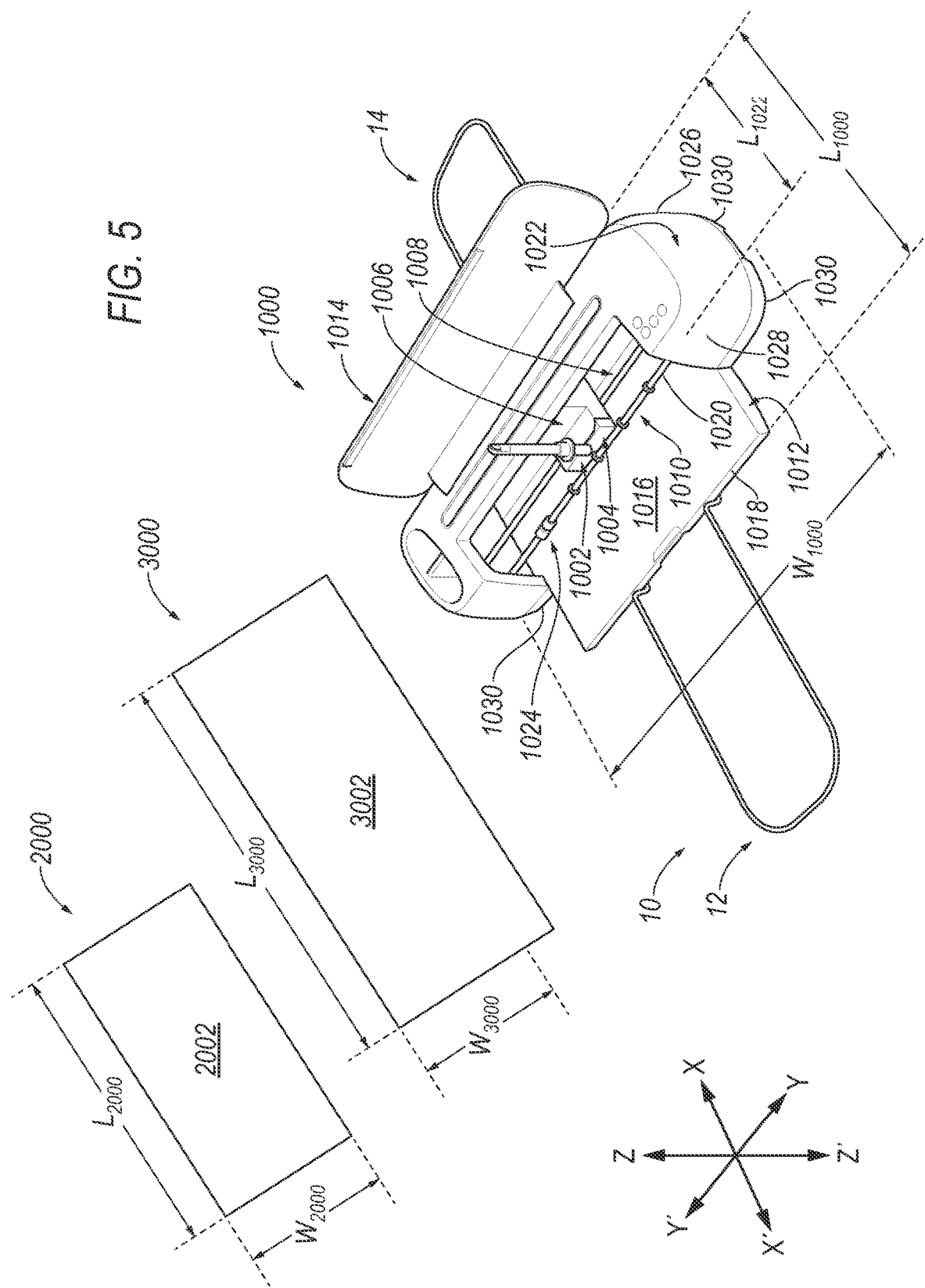
FIG. 5 is a perspective view of a workpiece, a workpiece support mat, and the crafting support system interfaced with the crafting apparatus of FIG. 4B.
Figure 6:
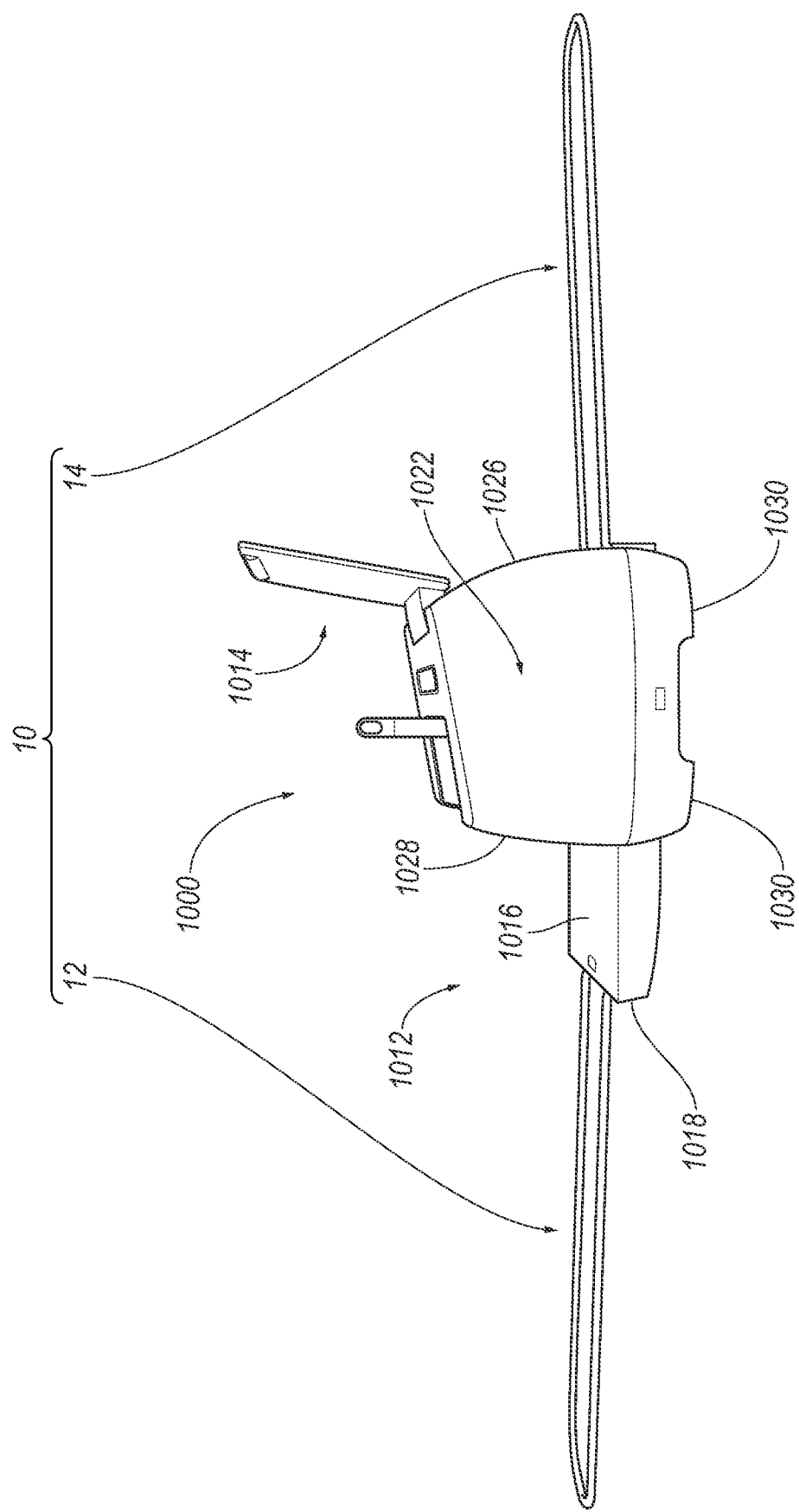
FIG. 6 is a side perspective view of the crafting support system interfaced with the crafting apparatus according to FIG. 4B.

With reference to FIGS. 4A-4B and 5, the crafting apparatus 1000 may be defined by a "use orientation length" (when a front door 1012 of the crafting apparatus 1000 is arranged in an open orientation), which may be hereinafter referred to as a length $L_{1000}$ (see, e.g., FIGS. 4A and 4B) of the crafting apparatus 1000. The crafting apparatus 1000 may also be defined by a width $W_{1000}$ (see, e.g., FIG. 5).

The workpiece 2000 includes any desirable shape, size, geometry or material composition. The shape/geometry may include, for example, a square or rectangular shape having a length $L_{2000}$ (e.g., between about 400 mm and 600 mm) and a width $W_{2000}$. The material composition of the workpiece 2000 may include paper-based products (e.g., paperboard or cardboard) and/or non-paper-based products (e.g., vinyl, foam, rigid foam, cushioning foam, plywood, veneer, balsawood or the like). Nevertheless, although various implementations of workpiece material composition may be directed to paper, vinyl or foam-based products, the material composition of the workpiece 2000 is not limited to a particular material and may include any material that may be modified during, for example, the cutting operation (i.e., the material defining the workpiece 2000 may be defined by a quality that renders the workpiece 2000 as being "cuttable").

The workpiece 2000 may be at least partially disposed within the crafting apparatus 1000 in order to permit the crafting apparatus 1000 to conduct work on the workpiece 2000. As mentioned above, the term "work" that is conducted upon the workpiece 2000 may include, but is not limited to, any number of tasks/functions performed by one or a combination of the printing device 1002 and the cutting device 1004. One or both of the printing device 1002 and the cutting device 1004 may be removably-secured to a carriage 1006 that is movably-disposed according to the direction of arrows Y, Y' (in, e.g., a three dimensional X-Y-Z Cartesian coordinate system) upon a member such as a rod 1008, bar or shaft. The movement Y, Y' of the carriage 1006 along the rod 1008 may be controlled by a motor (not shown) that receives actuation signals from a central processing unit (see, e.g., central processing unit 1050 at FIG. 13). In an example, the "work" may include a "cutting operation" that functionally includes contact of a blade of the cutting device 1004 with the workpiece 2000. The work conducted by the cutting device 1004 arises from movement of the cutting device 1004 according to the direction of arrows Z, Z' in, for example, the three dimensional X-Y-Z Cartesian coordinate system relative to, for example, one or more of the carriage 1006 and the rod 1008. The movement Z, Z' of the cutting device 1004 may be controlled by one or more motors that receive actuation signals from the central processing unit 1050.

Prior to interfacing the workpiece 2000 with the crafting apparatus 1000 for conducting work on the workpiece 2000, the workpiece 2000 may be arranged upon a cutting mat (see, e.g., a cutting mat 3000 at FIG. 5). The cutting mat 3000 includes any desirable shape, size, geometry or material composition. The shape/geometry may include, for example, a square or rectangular shape having a length $L_{3000}$ (e.g., between about 400 mm and 600 mm) and a width $W_{3000}$. The material composition of the cutting mat 3000 may include, for example, a soft material that may resist being deformed or cut by a blade or knife of the cutting device 1004 of the crafting apparatus 1000. The cutting mat 3000 may include an upper surface 3002 having, for example, a pressure-sensitive adhesive in order to temporarily secure the workpiece 2000 go the upper surface 3002 of the cutting mat 3000 as both of the workpiece 2000 and the cutting mat 3000 are interfaced with the crafting apparatus 1000.

With reference to FIG. 5, the crafting apparatus 1000 may include a passageway 1010 extending through a length $L_{1022}$ of a body 1022 of the crafting apparatus 1000. Access passageway 1010 is permitted when a front door 1012 of the crafting apparatus 1000 and a rear door 1014 of the crafting apparatus 1000 are arranged in an open orientation. Furthermore, as seen at FIG. 4A, a height $H_{1010}$ of the passageway 1010 is configured to permit passage of one of or both of a thickness of the workpiece 2000 and a thickness of the cutting mat 3000 through the body 1022 of the crafting apparatus 1000.

Referring to FIG. 5, when the front door 1012 of the crafting apparatus 1000 is arranged in an open orientation, an upper surface 1016 of the front door 1012 forms a support surface for supporting a portion of one or both of the length $L_{2000}$ of the workpiece 2000 and the length $L_{3000}$ of the cutting mat 3000. One or both of a trailing portion of the length $L_{2000}$ of the workpiece 2000 and a trailing portion of the length $L_{3000}$ of the cutting mat 3000 may extend beyond a trailing edge 1018 of the front door 1012, and, as such, one or both of the trailing portion of the length $L_{2000}$ of the workpiece 2000 and the length $L_{3000}$ of the cutting mat 3000 would not be supported by the front door 1012; in some instances, one or both of a leading portion of the length $L_{2000}$ of the workpiece 2000 and the length $L_{3000}$ of the cutting mat 3000 may extend beyond a leading edge 1020 of the front door 1012, and, as such, one or both of the leading portion of the length $L_{2000}$ of the workpiece 2000 and the length $L_{3000}$ of the cutting mat 3000 may be arranged within the body 1022 of the crafting apparatus 1000 that at least partially forms the passageway 1010. Upon arranging one or both of the leading portion of the length $L_{2000}$ of the workpiece 2000 and the length $L_{3000}$ of the cutting mat 3000 within the body 1022 of the crafting apparatus 1000, one or both of an upper surface 2002 of the workpiece 2000 and the upper surface 3002 the cutting mat 3000 contacts a roller mechanism 1024 that advances one or both of the workpiece 2000 and the cutting mat 3000 through the passageway 1010 according to the direction of arrows X, X'.

In some instances, the roller mechanism 1024 may advance the leading portion of one or both of the workpiece 2000 and the cutting mat 3000 through the passageway 1010 according to the direction of the arrow X and beyond a rear side 1026 of the body 1022. Accordingly, in some circumstances, if one or both of the workpiece 2000 and the cutting mat 3000 is/are advanced beyond the rear side 1026 of the body 1022, some or all of a leading portion of the length $L_{2000}$ of the workpiece 2000 and/or a leading portion of the length $L_{3000}$ of the cutting mat 3000 may not be supported by the body 1022 of the crafting apparatus 1000.

In other instances, the roller mechanism 1024 may advance one or both of the workpiece 2000 and the cutting mat 3000 through the passageway 1010 according to the direction of the arrow X' and beyond a front side 1028 of the body 1022. Accordingly, in some circumstances, if one or both of the workpiece 2000 and the cutting mat 3000 is advanced beyond the front side 1028 of the body 1022, some or all of a trailing portion of one or both of the length $L_{2000}$ of the workpiece 2000 and the length $L_{3000}$ of the cutting mat 3000 may not be supported by one or both of the upper surface 1016 of the front door 1012 and the body 1022 of the crafting apparatus 1000.

As seen at FIGS. 4B, 5, 6, and 7, upon arranging the crafting apparatus 1000 near, proximate, upon, or with the crafting support system 10, one or both of the length $L_{2000}$ of the workpiece 2000 and the length $L_{3000}$ of the cutting may 3000 may be greater than the length $L_{1000}$ of the crafting apparatus 1000 or the length $L_{1022}$ of a body 1022 of the crafting apparatus 1000; accordingly, a leading or trailing portion of one or both of the workpiece 2000 and the cutting mat 3000 that may not be supported by the upper surface 1016 of the front door 1012 or the body 1022 of the crafting apparatus 1000. In some instances, when the leading or trailing portion of one or both of the workpiece 2000 and the cutting mat 3000 is not supported by the upper surface 1016 of the front door 1012 or the body 1022 of the crafting apparatus 1000, one or both of the workpiece 2000 and the cutting mat 3000 may curl, roll, bow, or fold thereby potentially affecting the work conducted by the crafting apparatus 1000 on the workpiece 2000. Furthermore, when the leading or trailing portion of one or both of the workpiece 2000 and the cutting mat 3000 is not supported by the upper surface 1016 of the front door 1012 or the body 1022 of the crafting apparatus 1000, one or both of the workpiece 2000 and the cutting mat 3000 may be undesirably ejected from the crafting apparatus 1000 and fall upon, for example, a floor surface (not shown) if, for example, the crafting apparatus 1000 is arranged near an end or edge $T_E$ (see, e.g., FIGS. 4A-4B) of a table T (see, e.g., FIGS. 4A-4B).

Therefore, the crafting support system 10 is configured to define a length $L_{10}$ that may be greater than one or both of the length $L_{2000}$ of the workpiece 2000 and the length $L_{3000}$ of the cutting may 3000. Accordingly, the crafting support system 10 will provide axial support to, for example, any of the leading or trailing portion of one or both of the workpiece 2000 and the cutting mat 3000 that may not be otherwise supported by the upper surface 1016 of the front door 1012 or the body 1022 of the crafting apparatus 1000. With reference to FIG. 5, in some instances, if, for example, one or both of the workpiece 2000 and the cutting mat 3000 is advanced beyond the rear side 1026 of the body 1022, some or all of the leading portion of the length $L_{2000}$ of the workpiece 2000 or the leading portion of the length $L_{3000}$ of the cutting mat 3000 that would not be supported by the body 1022 of the crafting apparatus 1000 would be supported by the distal portion 14 of the crafting support system 10. In another example, if one or both of the workpiece 2000 and the cutting mat 3000 is advanced beyond the front side 1028 of the body 1022, some or all of the trailing portion of the length $L_{2000}$ of the workpiece 2000 or the trailing portion of the length $L_{3000}$ of the cutting mat 3000 that would not be supported by one or both of the upper surface 1016 of the front door 1012 and the body 1022 of the crafting apparatus 1000 would be supported by the proximal portion 12 of the crafting support system 10.

Referring to FIG. 1, the proximal portion 12 is defined by a length $L_{12}$ that extends between a proximal end 12a of the proximal portion 12 and a distal end 12b of the proximal portion 12. The proximal portion 12 includes a support rod 16 and at least one proximal support pad 18. In some configurations, the at least one proximal support pad 18 includes a first proximal support pad 18a and a second proximal support pad 18b.

The support rod 16 may include a metal material that is powder coated. The support rod 16 may be defined by a diameter equal to approximately about 5 mm.

The support rod 16 may be shaped, formed, bent, or cast to form a substantially U-shape configuration. The U-shaped configuration of the support rod 16 generally includes, for example, a base member 20, a first arm 22 extending from a first end $20_1$ of the base member 20, and a second arm 24 extending from a second end $20_2$ of the base member 20. The proximal portion 12 is further defined by a width $W_{12}$ that extends between the first arm 22 and the second arm 24.

The first arm 22 includes a first segment 22a, a second segment 22b, and an intermediate segment 22c. The intermediate segment 22c connects a distal end $22a_D$ of the first segment 22a to a proximal end $22b_P$ of the second segment 22b. A proximal end $22a_P$ of the first segment 22a is connected to the first end $20_1$ of the base member 20. The intermediate segment 22c axially offsets the first segment 22a from the second segment 22b (that will contribute to forming a recess or well 40 of the crafting support system 10 that will be described in the following disclosure). The first segment 22a extends along a first portion $L_{12-1}$ of the length $L_{12}$ of proximal portion 12 of the crafting support system 10, and the second segment 22b extends along a second portion $L_{12-2}$ of the length $L_{12}$ of proximal portion 12 of the crafting support system 10.

The second arm 24 includes a first segment 24a, a second segment 24b, and an intermediate segment 24c. The intermediate segment 24c connects a distal end $24a_D$ of the first segment 24a to a proximal end $24b_P$ of the second segment 24b. A proximal end $24a_P$ of the first segment 24a is connected to the second end $20_2$ of the base member 20. The intermediate segment 24c axially offsets the first segment 24a from the second segment 24b (that will contribute to forming a recess or well 40 of the crafting support system 10 that will be described in the following disclosure). Like the first segment 22a of the first arm 22, the first segment 24a of the second arm 24 extends along the first portion $L_{12-1}$ of the length $L_{12}$ of proximal portion 12 of the crafting support system 10, and, like the second segment 22b of the first arm 22, the second segment 24b of the second arm 24 extends along the second portion $L_{12-2}$ of the length $L_{12}$ of proximal portion 12 of the crafting support system 10; accordingly, in some configurations, the first arm 22 and the second arm 24 may include a similar shape or configuration.

In some implementations, both of the first proximal support pad 18a and the second proximal support pad 18b are connected to, over-molded, or supported by the second segment 22b of the first arm 22 and the second segment 24b of the second arm 24. A first portion of each of the second segment 22b of the first arm 22 and the second segment 24b of the second arm 24 may extend through all of a length $L_{18a}$ of the first proximal support pad 18a, and a second portion of each of the second segment 22b of the first arm 22 and the second segment 24b of the second arm 24 may extend through most but not all of a length $L_{18b}$ of the second proximal support pad 18b. Each of the first proximal support pad 18a and the second proximal support pad 18b may be formed from a plastic material such as, for example, polycarbonate (PC), acrylonitrile butadiene styrene (ABS), or a combination thereof.

In some instances, a first end 18a1 of the first proximal support pad 18a is connected to, over-molded, or supported by the proximal end $22b_P$ of the second segment 22b of the first arm 22, and, a second end 18a2 of the first proximal support pad 18a is connected to, over-molded, or supported by the proximal end $24b_P$ of the second segment 24b of the second arm 24. In other examples, a first end $18b_1$ of the second proximal support pad 18b is connected to, over-molded, or supported by a distal end $22b_D$ of the second segment 22b of the first arm 22, and, a second end $18b_2$ of the second proximal support pad 18b is connected to, over-molded, or supported by a distal end $24b_D$ of the second segment 24b of the second arm 24.

Each of the first proximal support pad 18a and the second proximal support pad 18b may be respectively defined by a width $W_{18a}$, $W_{18b}$ that extends between the side surfaces $18_{S1}$, $18_{S2}$ of each of the first proximal support pad 18a and the second proximal support pad 18b. The widths $W_{18a}$, $W_{18b}$ of each of the first proximal support pad 18a and the second proximal support pad 18b may also define the width $W_{12}$ of the proximal portion 12 of the crafting support system 10.

In some implementations, the first proximal support pad 18a includes at least one interference-fit post or boss 26. In some configurations, the at least one interference-fit post or boss 26 includes a first interference-fit post or boss 26a and a second interference-fit post or boss 26b.

The first interference-fit post or boss 26a extends away from a first side $18_{S1}$ of the first proximal support pad 18a near the first end $18a_1$ of the first proximal support pad 18a. The second interference-fit post or boss 26b extends away from a second side $18_{S2}$ of the first proximal support pad 18a near the second end $18a_2$ of the first proximal support pad 18a.

With continued reference to FIG. 1, the distal portion 14 is defined by a length $L_{14}$ that extends between a proximal end 14a of the distal portion 14 and a distal end 14b of the distal portion 14. The distal portion 14 includes a support rod 28 and a distal support pad 30. In some configurations, the distal support pad 30 includes a base portion 30a and a shoulder portion 30b that extends away from the base portion 30a.

The support rod 28 may include a metal material that is powder coated. The support rod 28 may be defined by a diameter equal to approximately about 5 mm.

The support rod 28 may be shaped, formed, bent, or cast to form a substantially U-shape configuration. The U-shaped configuration of the support rod 28 generally includes, for example, a base member 32, a first arm 34 extending from a first end $32_1$ of the base member 32, and a second arm 36 extending from a second end $32_2$ of the base member 32. The distal portion 14 is further defined by a width $W_{14}$ that extends between the first arm 34 and the second arm 36.

The first arm 34 includes a first segment 34a and a second segment 34b. The second segment 34b extends axially away from a distal end $34a_D$ of the first segment 34a. A proximal end $34a_P$ of the first segment 34a is connected to the first end $32_1$ of the base member 32. The second segment 34b axially extends into a first end $30b_1$ of the shoulder portion 30b of the distal support pad 30. Because the second segment 34b extends away from the first segment 34a, the second segment 34b results in at least the base portion 30a of the distal support pad 30 being offset from the first segment 34a (that will contribute to forming a recess or well 40 of the crafting support system 10 that will be described in the following disclosure).

The first segment 34a extends along a first portion $L_{14-1}$ of the length $L_{14}$ of distal portion 14 of the crafting support system 10. The base portion 30a of the distal support pad 30 extends along a second portion $L_{14-2}$ of the length $L_{14}$ of distal portion 14 of the crafting support system 10, which may also be referred to as a length $L_{30}a$ of the distal support pad 30.

The second arm 36 includes a first segment 36a and a second segment 36b. The second segment 36b extends axially away from a distal end $36a_D$ of the first segment 36a. A proximal end $36a_P$ of the first segment 36a is connected to the second end $32_2$ of the base member 32. The second segment 36b axially extends into a second end $30b_2$ of the shoulder portion 30b of the distal support pad 30. Because the second segment 36b extends away from the first segment 36a, the second segment 36b results in at least the base portion 30a of the distal support pad 30 being offset from the first segment 36a (that will contribute to forming a recess or well 40 of the crafting support system 10 that will be described in the following disclosure).

The first segment 36a extends along the first portion $L_{14-1}$ of the length $L_{14}$ of distal portion 14 of the crafting support system 10, and the base portion 30a of the distal support pad 30 extends along the second portion $L_{14-2}$ of the length $L_{14}$ of distal portion 14 of the crafting support system 10, which may also be referred to as the length $L_{30a}$ of the distal support pad 30 as described above.

In some implementations, the distal support pad 30 is connected to, over-molded, or supported by the second segment 34b of the first arm 34 and the second segment 36b of the second arm 36. The distal support pad 30 may be formed from a plastic material such as, for example, polycarbonate (PC), acrylonitrile butadiene styrene (ABS), or a combination thereof.

The distal support pad 30 may be defined by a width $W_{30}$ that extends between a first side surface $30a_1$ (see, e.g., FIG. 3) of the base portion 30a of the distal support pad 30 and a second side surface $30a_2$ (see, e.g., FIG. 3) of the base portion 30a of the distal support pad 30. The width $W_{30}$ of the distal support pad 30 may also define the width $W_{14}$ of the distal portion 14 of the crafting support system 10.

As seen at FIG. 2, when the crafting support system 10 is arranged in the "disconnected orientation" or the "stowed orientation", the width $W_{30}$ of the distal support pad 30 may be approximately the same as but slightly greater than a width (e.g., approximately equal to the width $W_{18a}$ of the first proximal support pad 18a) extending between the first interference-fit post or boss 26a and the second interference-fit post or boss 26b of the first proximal support pad 18a such that the distal portion 14 of the crafting support system 10 may be selectively secured to the proximal portion 12 of the crafting support system 10 in an axially stacked orientation that defines the "disconnected orientation" or the "stowed orientation" of the crafting support system 10.

With reference to FIG. 3, the base portion 30a of the distal support pad 30 may further include an intermediate side surface $30a_3$ that connects the first side surface $30a_1$ of the base portion 30a of the distal support pad 30 to the second side surface $30a_2$ of the base portion 30a of the distal support pad 30. The intermediate side surface $30a_3$ of the base portion 30a of the distal support pad 30 of the distal portion 14 of the crafting support system 10 may include at least one connecting portion 38, which may be, for example, a magnet. A corresponding intermediate side surface of the second proximal support pad 18b of the proximal portion 12 of the crafting support system 10 may also include at least one connecting portion (not shown), which may be, for example, a magnet. The magnet 38 of each of the distal portion 14 of the crafting support system 10 and the proximal portion 12 of the crafting support system 10 may be utilized for selectively connecting or coupling the distal portion 14 of the crafting support system 10 and the proximal portion 12 of the crafting support system 10 for arranging the crafting support system 10 in the "connected orientation" or the "use orientation" as seen at FIG. 1.

With reference to FIG. 1, once the crafting support system 10 is arranged in the "connected orientation" or the "use orientation", the length $L_{10}$ of the crafting support system 10 includes a proximal length portion $L_{10\text{-}P}$, a distal length portion $L_{10\text{-}D}$, and an intermediate length portion $L_{10\text{-}1}$. The intermediate length portion $L_{10\text{-}1}$ extends between the proximal length portion $L_{10\text{-}P}$ and the distal length portion $L_{10\text{-}D}$.

The proximal length portion $L_{10\text{-}P}$ may be approximately equal to a length (see, e.g., the first portion $L_{12\text{-}1}$ of the length $L_{12}$ of proximal portion 12 of the crafting support system 10) of the first segment 22a, 24a of each of the first arm 22 and the second arm 24 of the support rod 16 of the proximal portion 12 of the crafting support system 10. The distal length portion $L_{10\text{-}D}$ may be approximately equal to the a length (see, e.g., the first portion $L_{14\text{-}1}$ of the length $L_{14}$ of distal portion 14 of the crafting support system 10) of the first segment 34a, 36a of each of the first arm 34 and the second arm 36 of the support rod 28 of the distal portion 14 of the crafting support system 10.

Figure 7:
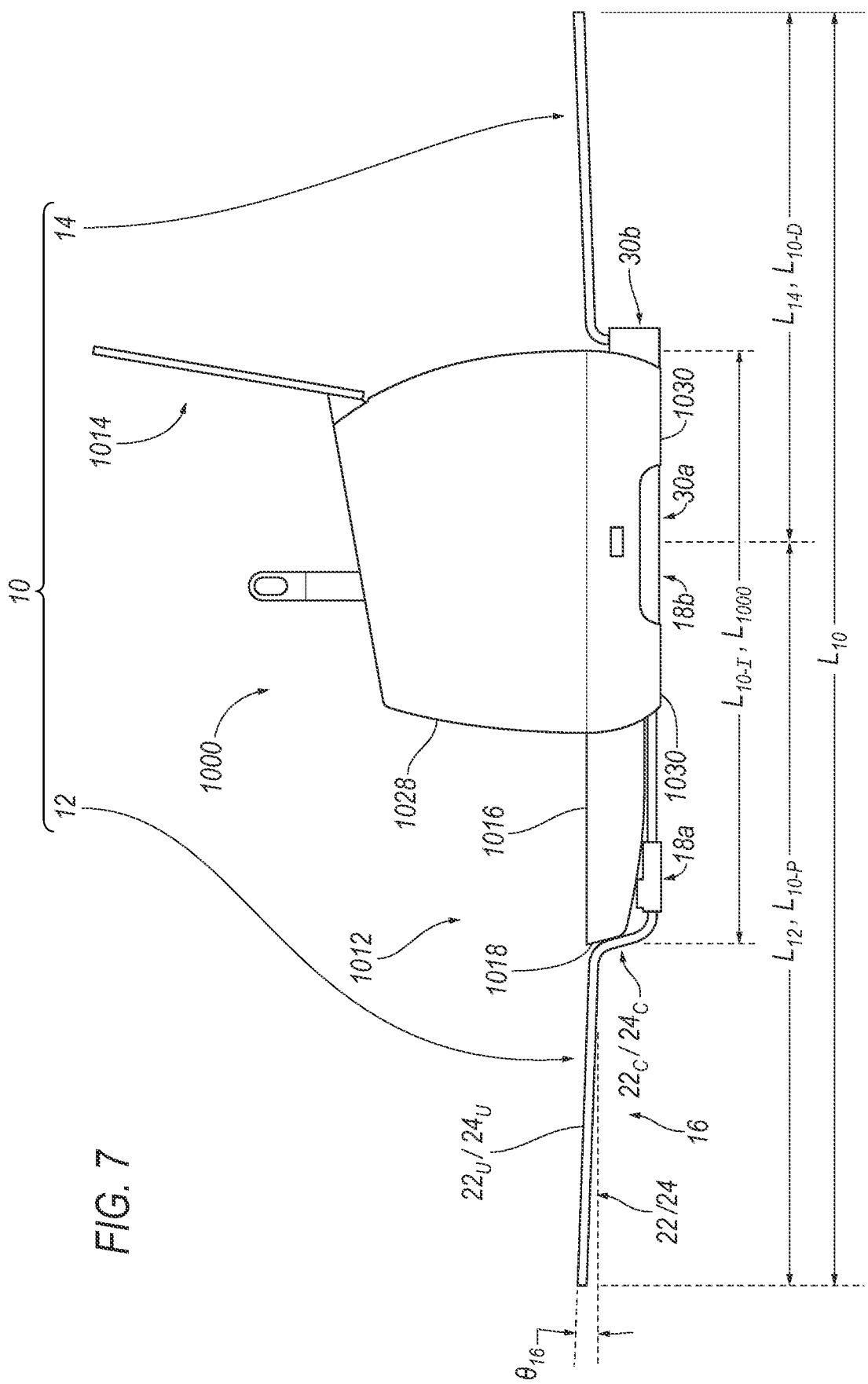
FIG. 7 is a side view of the crafting support system interfaced with the crafting apparatus according to FIG. 4B.

The second portion $L_{12\text{-}2}$ of the length $L_{12}$ of proximal portion 12 of the crafting support system 10 and the second portion $L_{14\text{-}2}$ of the length $L_{14}$ of distal portion 14 of the crafting support system 10 may collectively define the intermediate length portion $L_{10\text{-}1}$ of the crafting support system 10. As seen at FIGS. 4A-4B and 7, the intermediate length portion $L_{10\text{-}1}$ may define the recess or well 40 of the crafting support system 10 that is approximately equal to but slightly greater than the length the length $L_{1000}$ of the crafting apparatus 1000 (when the front door 1012 of the crafting apparatus 1000 is arranged in the open orientation). Accordingly, the recess or well 40 of the crafting support system 10 is configured to receive, support, be interfaced with, or be positioned relative the crafting apparatus 1000. Furthermore, when the front door 1012 of the crafting apparatus 1000 is arranged in the open orientation, portions of the crafting support system 10 defined by the proximal length portion $L_{10\text{-}P}$ and the distal length portion $L_{10\text{-}D}$ provides a supplemental support surface for further supporting a portion of one or both of the length $L_{2000}$ of the workpiece 2000 and the length $L_{3000}$ of the cutting mat 3000 that may extend beyond and would not be supported by one or both of the upper surface 1016 of the front door 1012 and the body 1022 of the crafting apparatus 1000.

Furthermore any of the widths $W_{12}$, $W_{14}$, $W_{18a}$, $W_{18b}$, $W_{30}$ of the crafting support system 10 may be configured to be arranged and secured within a gap extending in a width direction between support members 1030 (see, e.g., FIGS. 5, 6, and 7) of the crafting apparatus 1000. Accordingly, the widths $W_{12}$, $W_{14}$, $W_{18a}$, $W_{18b}$, $W_{30}$ of the crafting support system 10 may sized in order to prevent lateral shifting between the support members 1030 of the crafting apparatus 1000.

Furthermore, the recess or well 40 of the crafting support system 10 defined by the intermediate length portion $L_{10\text{-}1}$ of the crafting support system 10 may be sized or configured to prevent longitudinal shifting between the proximal portion 12 of the crafting support system 10 and the distal portion 14 of the crafting support system 10. For example, as seen at FIG. 7, the longitudinal shifting may be limited or prevented as a result of: (1) the trailing edge 1018 of the front door 1012 of the crafting apparatus 1000 being disposed near, adjacent, or opposite the intermediate segments 22c, 24c of the first arm 22 and the second arm 24 of the support rod 16 of the proximal portion 12 of the crafting support system 10; and (2) the rear side 1026 of the body 1022 of the crafting apparatus 1000 being disposed near, adjacent, or opposite the shoulder portion 30b of the distal support pad 30 of the distal portion 14 crafting support system 10.

With continued reference to FIG. 7, in some configurations, the upper surface 1016 of the front door 1012 of the crafting apparatus 1000 may be substantially coplanar with an upper surface $22_U$, $24_U$ the first arm 22 and the second arm 24 of the support rod 16 of the proximal portion 12 of the crafting support system 10 in order to provide a supplemental support surface for further supporting a portion of one or both of the length $L_{2000}$ of the workpiece 2000 and the length $L_{3000}$ of the cutting mat 3000 that may extend beyond and would not be supported by one or both of the upper surface 1016 of the front door 1012 and the body 1022 of the crafting apparatus 1000. However, in some configurations, the upper surface $22_U$, $24_U$ the first arm 22 and the second arm 24 of the support rod 16 of the proximal portion 12 of the crafting support system 10 may be pitched at an angle $\theta_{16}$ relative the upper surface 1016 of the front door 1012 and the body 1022 of the crafting apparatus 1000. In some configurations, the angle $\theta_{16}$ may be approximately equal to 3°.

Figure 8:
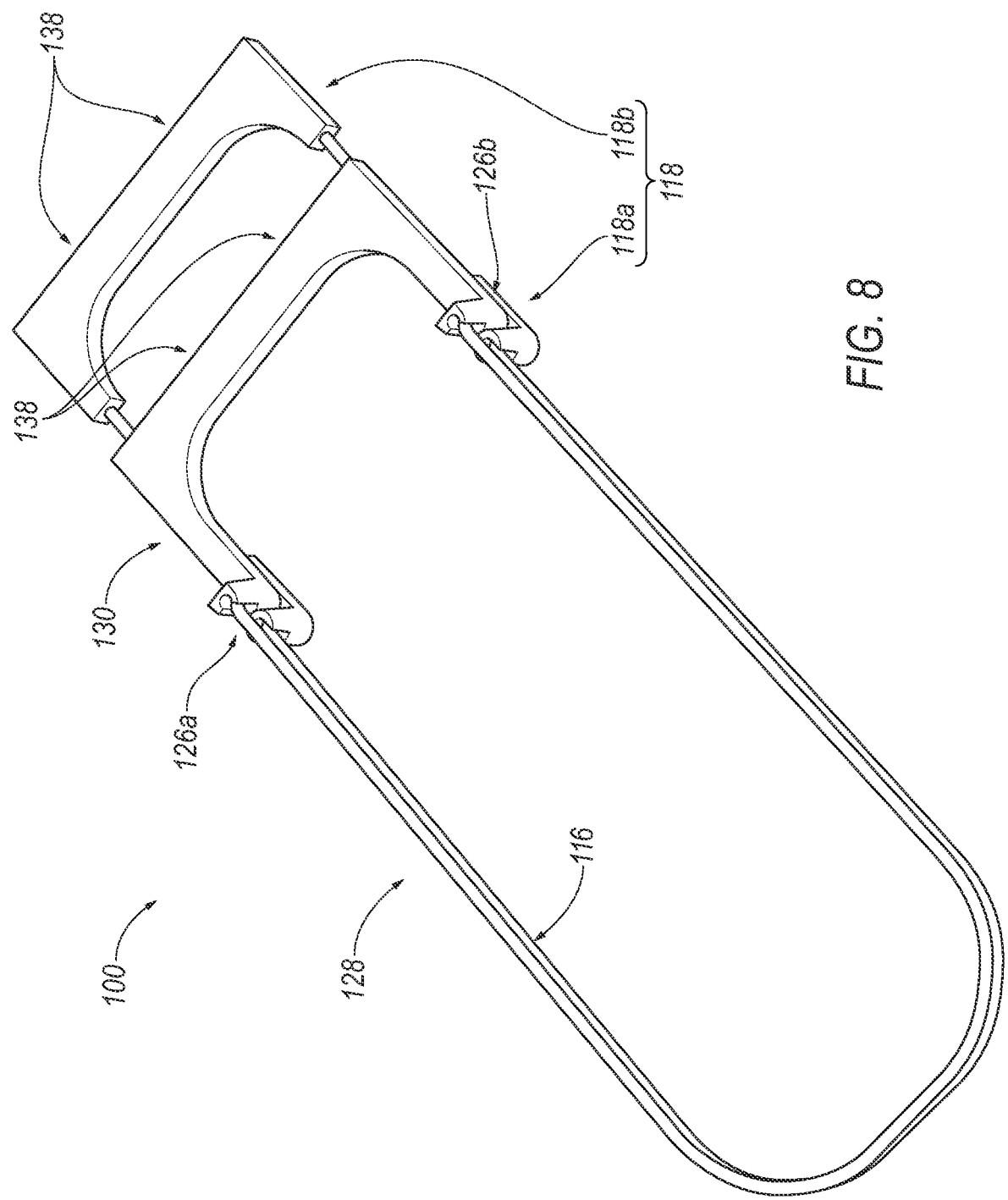
FIG. 8 is a perspective view of another exemplary crafting support system including a proximal portion and a distal portion that are arranged in a stowed orientation.

As seen at FIG. 8, an exemplary crafting support system is shown generally at 100. The crafting support system 100 is similar to the crafting support system 10 as described above and includes the same components (e.g.: support rods 116, 128; support pads 118, 130; interference fit posts 126a, 126b; magnets 138; and the like); as such, the description of the crafting support system 10 also applies to the crafting support system 100 with the exception that the reference numerals of the crafting support system 100 includes a "century increment" by one-hundred. With reference to FIG. 8, the crafting support system 100 is shown in a "disconnected orientation" or a "stowed orientation". A departure in structure of the crafting support system 100 when compared to the crafting support system 10 is that the support pads 118, 130 are formed with less material than the support pads 18, 30 of the crafting support system 10.

Figure 9:
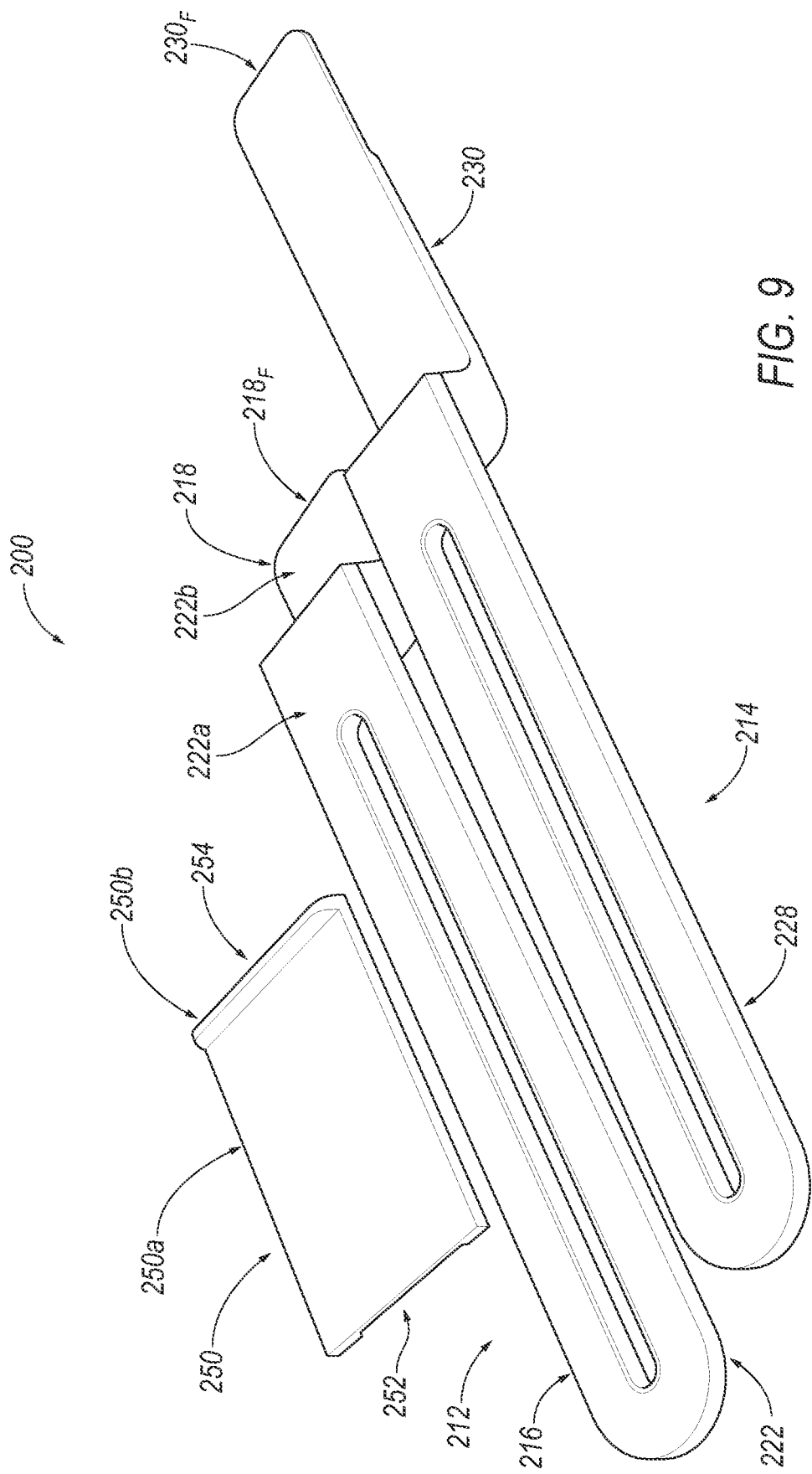
FIG. 9 is a perspective view of yet another exemplary crafting support system including a proximal portion and a distal portion that are arranged in a separated orientation.
Figure 10:
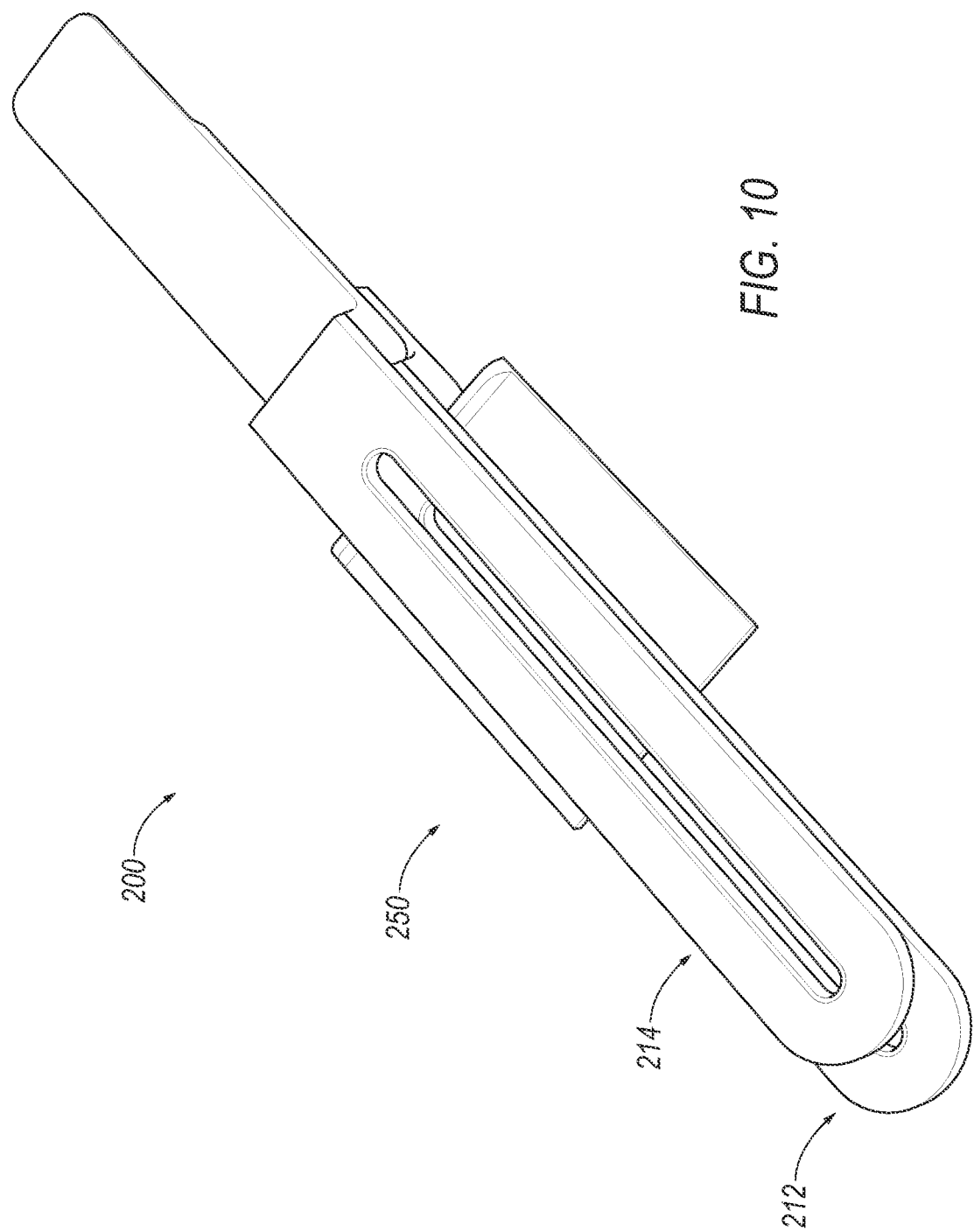
FIG. 10 is a perspective view of the crafting support system of FIG. 9 arranged in a stowed orientation.

As seen at FIGS. 9-10, an exemplary crafting support system is shown generally at 200. The crafting support system 200 is similar to the crafting support system 10 as described above and includes similar components (e.g.: support rods 216, 228; and support pads 218, 230); as such, the description of the crafting support system 10 also applies to the crafting support system 200 with the exception that the reference numerals of the crafting support system 200 includes a "century increment" by two-hundred. With reference to FIG. 8, the crafting support system 200 is shown in a "separated orientation" and at FIG. 9, the crafting support system 200 is shown in a "disconnected orientation" or a "stowed orientation". A departure in structure of the crafting support system 200 when compared to the crafting support system 10 is that the support pads 218, 230 include terminal flange portions $218_F$, $230_F$ that are respectively sized for arrangement within slots 252, 254 of an intermediate bridge pad 250.

As seen at FIG. 9, the intermediate bridge pad 250 is shaped in and functions substantially similar to the distal support pad 30 of the distal portion 14 crafting support system 10 whereby the intermediate bridge pad 250 includes a base portion 250a (that is substantially similar to the shape and function of the base portion 30a of the distal support pad 30 of the distal portion 14 crafting support system 10) and a shoulder portion 250b (that is substantially similar to the shape and function of the should portion 30b of the distal support pad 30 of the distal portion 14 crafting support system 10) that extends away from the base portion 250a.

Figure 11:
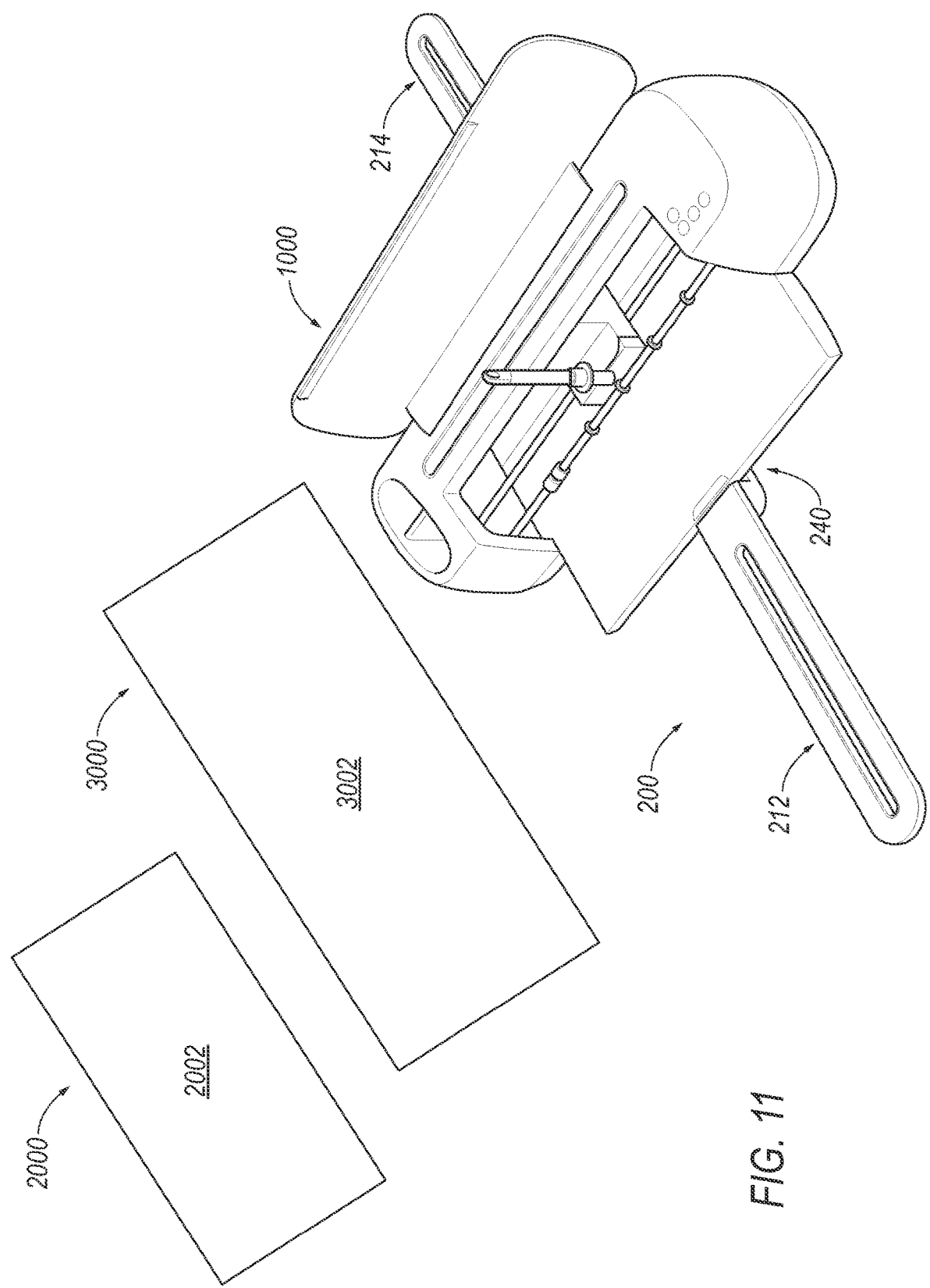
FIG. 11 is a perspective view of a workpiece, a workpiece support mat, a crafting apparatus, and the crafting support system of FIG. 9 interfaced with the crafting apparatus.
Figure 12:
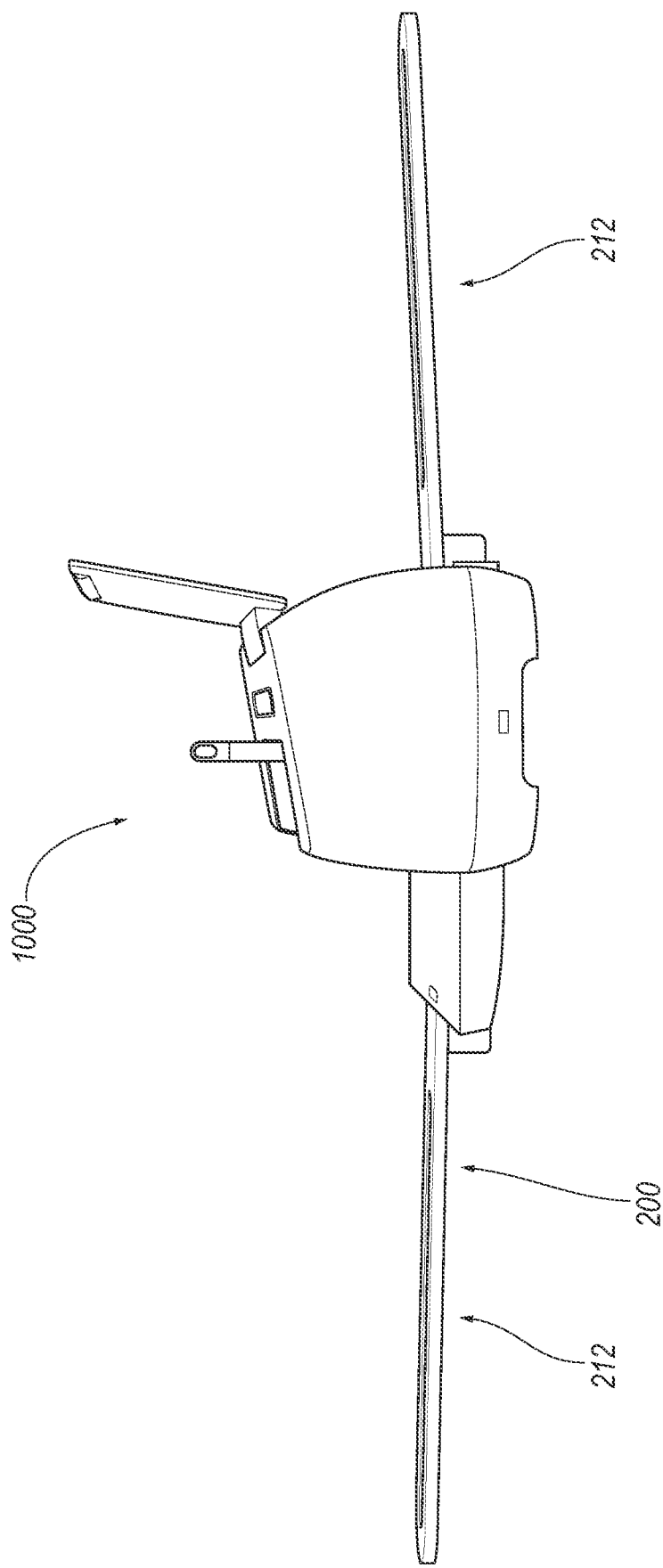
FIG. 12 is a side perspective view of the crafting support system interfaced with the crafting apparatus of FIG. 11.

The intermediate bridge pad 250 also forms a proximal slot 252 (see, e.g., FIG. 9) and a distal slot 254 (see, e.g., FIG. 9). The proximal slot 252 is sized to receive the terminal flange portions $218_F$ that may extend from, for example, a second segment 222b of an arm 222 of the proximal portion 212 of the crafting support system 200. The distal slot 254 is sized to receive the terminal flange portions $230_F$ that may extend from, for example, an arm 230 of the distal portion 214 of the crafting support system 200. Once the proximal portion 212 of the crafting support system 200 and the distal portion 214 of the crafting support system 200 are connected to the intermediate bridge pad 250, the crafting support system 200 forms a recess or well 240 (see, e.g., FIG. 11) of the crafting support system 200 is configured to receive, support, be interfaced with, or be positioned relative the crafting apparatus 1000 as seen at FIGS. 11 and 12.

Figure 13:
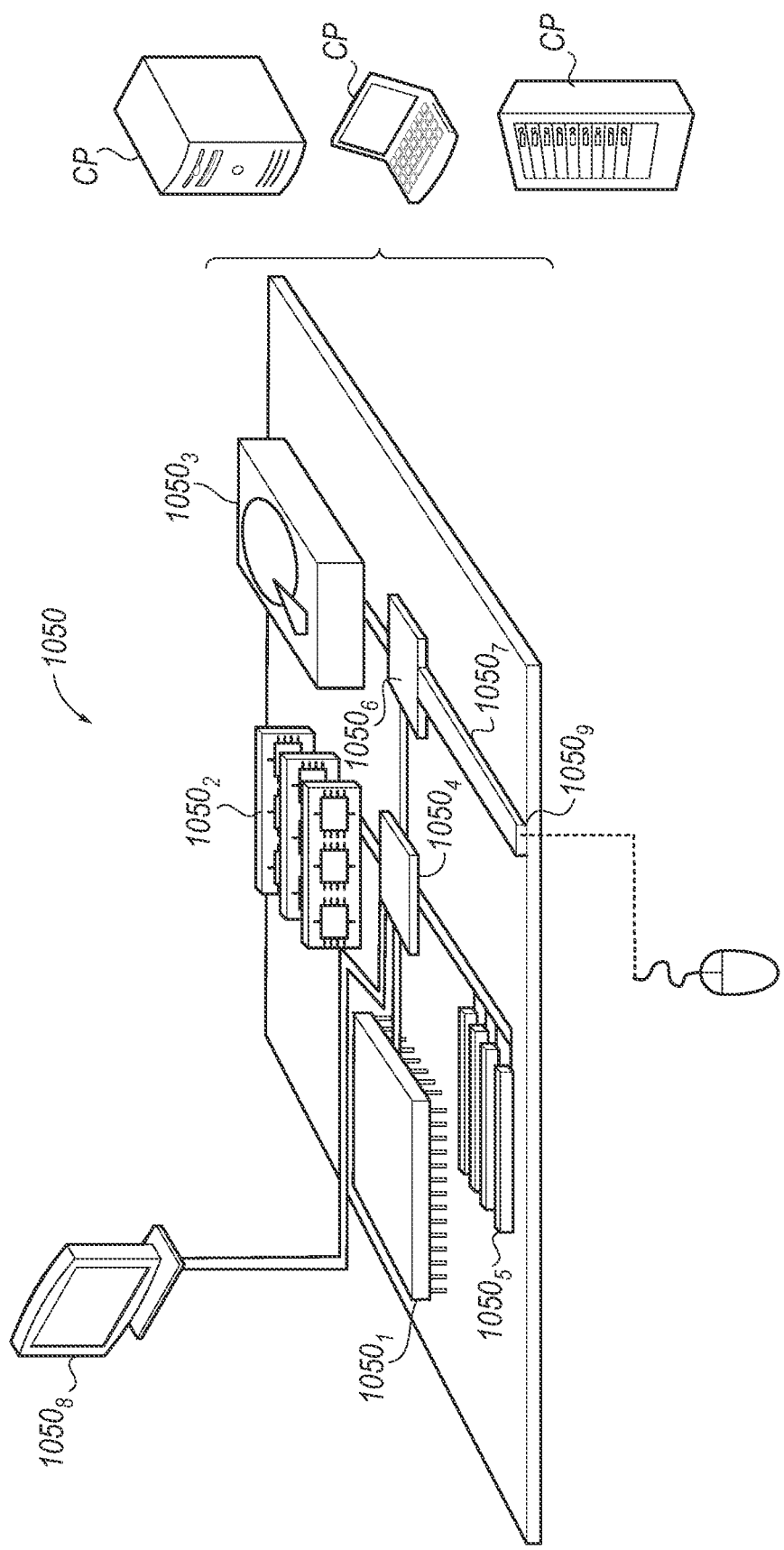
FIG. 13 is a schematic view of an example computing device that may be used to implement the systems and methods described herein.

FIG. 13 is schematic view of an example CPU 1050, which may be alternatively referred to as a computing device that may be used to implement the systems and methods described in this document. The components $1050_1$, $1050_2$, $1050_3$, $1050_4$, $1050_5$, and $1050_6$ shown at FIG. 13, their connections and relationships, and their functions, are meant to be exemplary only, and are not meant to limit implementations of the inventions described and/or claimed in this document.

The computing device 1050 includes a processor $1050_1$, memory $1050_2$, a storage device $1050_3$, a high-speed interface/controller $1050_4$ connecting to the memory $1050_2$ and high-speed expansion ports $1050_5$, and a low speed interface/controller $1050_6$ connecting to a low speed bus $1050_7$ and a storage device $1050_3$. Each of the components $1050_1$, $1050_2$, $1050_3$, $1050_4$, $1050_5$, and $1050_6$, are interconnected using various busses, and may be mounted on a common motherboard or in other manners as appropriate. The processor $1050_1$ can process instructions for execution within the computing device 1050, including instructions stored in the memory $1050_2$ or on the storage device $1050_3$ to display graphical information for a graphical user interface (GUI) on an external input/output device, such as display $1050_8$ coupled to high speed interface $1050_4$. In other implementations, multiple processors and/or multiple buses may be used, as appropriate, along with multiple memories and types of memory. Also, multiple computing devices 1050 may be connected, with each device providing portions of the necessary operations (e.g., as a server bank, a group of blade servers, or a multi-processor system).

The memory $1050_2$ stores information non-transitorily within the computing device 1050. The memory $1050_2$ may be a computer-readable medium, a volatile memory unit(s), or non-volatile memory unit(s). The non-transitory memory $1050_2$ may be physical devices used to store programs (e.g., sequences of instructions) or data (e.g., program state information) on a temporary or permanent basis for use by the computing device 1050. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device $1050_3$ is capable of providing mass storage for the computing device 1050. In some implementations, the storage device $1050_3$ is a computer-readable medium. In various different implementations, the storage device $1050_3$ may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory $1050_2$, the storage device $1050_3$, or memory on processor $1050_1$.

The high speed controller $1050_4$ manages bandwidth-intensive operations for the computing device 1050, while the low speed controller $1050_6$ manages lower bandwidth-intensive operations. Such allocation of duties is exemplary only. In some implementations, the high-speed controller $1050_4$ is coupled to the memory $1050_2$, the display $1050_8$ (e.g., through a graphics processor or accelerator), and to the high-speed expansion ports $1050_5$, which may accept various expansion cards (not shown). In some implementations, the low-speed controller $1050_6$ is coupled to the storage device $1050_3$ and a low-speed expansion port $1050_9$. The low-speed expansion port $1050_9$, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The CPU 1050 of the crafting apparatus 1000 may be implemented in a number of different forms, as shown in the figure. For example, it may be implemented in one or a combination of the crafting apparatus 1000 and a laptop computer CP.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A crafting support system configured to receive a crafting apparatus, the crafting support system comprising:
   a proximal portion; and
   a distal portion removably connected to the proximal portion, wherein each of the proximal portion and the distal portion includes:
      a support rod; and
      at least one support pad connected to the support rod,
   wherein a first portion of the support rod of the proximal portion is offset from a second portion of the support rod of the proximal portion,
   wherein, when the distal portion is connected to the proximal portion, the second portion of the support rod of the proximal portion, the at least one support pad of the proximal portion, and the at least one support pad of the distal portion collectively form a base of a well that is sized for receiving and supporting the crafting apparatus,
   wherein an upper surface of the first portion of the support rod of the proximal portion is configured to be substantially aligned with an upper surface of a door of the crafting apparatus received at the well with the door in an open orientation,
   wherein the support rod of the distal portion includes:
      a base member;
      a first arm extending from a first end of the base member; and
      a second arm extending from a second end of the base member, wherein each of the first arm and the second arm includes a first segment and a second segment extending away from a distal end of the first segment,
   wherein a proximal end of the first segment of the first arm is connected to the first end of the base member,
   wherein a proximal end of the first segment of the second arm is connected to the second end of the base member, and
   wherein the at least one support pad of the distal portion includes:
      a base portion; and
      a shoulder portion having:
         a proximal end that extends from and is connected to the base portion of the at least one support pad; and
         a distal end that extends across and connects the second segment of each of the first arm and the second arm.

2. The crafting support system of claim 1, wherein the support rod of the proximal portion includes:
   a base member;
   a first arm extending from a first end of the base member; and
   a second arm extending from a second end of the base member.

3. The crafting support system of claim 2, wherein each of the first arm and the second arm of the support rod of the proximal portion includes:
   a first segment;
   a second segment; and
   an intermediate segment that connects a distal end of the first segment to a proximal end of the second segment.

4. The crafting support system of claim 3, wherein the at least one support pad of the proximal portion includes a first proximal pad portion extending across and connecting the proximal end of the second segment of each of the first arm and the second arm of the support rod of the proximal portion.

5. The crafting support system of claim 4, wherein the at least one support pad of the proximal portion includes a second proximal pad portion extending across and connecting a distal end of the second segment of each of the first arm and the second arm of the support rod of the proximal portion.

6. The crafting support system of claim 3, wherein a proximal end of the first segment of the first arm of the support rod of the proximal portion is connected to the first end of the base member of the support rod of the proximal portion, wherein a proximal end of the first segment of the second arm of the support rod of the proximal portion is connected to the second end of the base member of the support rod of the proximal portion.

7. The crafting support system of claim 6, wherein:
   the intermediate segment of each of the first arm and the second arm of the support rod of the proximal portion axially extends between:
      the first segment of each of the first arm and the second arm of the support rod of the proximal portion; and
      the second segment of each of the first arm and the second arm of the support rod of the proximal portion for axially offsetting the first segment of each of the first arm and the second arm of the support rod of the proximal portion from the second segment of each of the first arm and the second arm of the support rod of the proximal portion.

* * * * *